United States Patent
De Vaan

(10) Patent No.: US 9,482,413 B2
(45) Date of Patent: Nov. 1, 2016

(54) COLOUR SEQUENTIAL LIGHTING DEVICE

(71) Applicant: KONINKLIJKE PHILIPS N.V., Eindhoven (NL)

(72) Inventor: Adrianus Johannes Stephanus Maria De Vaan, 'S-Hertogenbosch (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/390,518

(22) PCT Filed: Apr. 2, 2013

(86) PCT No.: PCT/IB2013/052614
§ 371 (c)(1),
(2) Date: Oct. 3, 2014

(87) PCT Pub. No.: WO2013/150441
PCT Pub. Date: Oct. 10, 2013

(65) Prior Publication Data
US 2015/0176813 A1 Jun. 25, 2015

Related U.S. Application Data

(60) Provisional application No. 61/620,487, filed on Apr. 5, 2012.

(51) Int. Cl.
*F21V 14/08* (2006.01)
*F21S 10/00* (2006.01)
(Continued)

(52) U.S. Cl.
CPC ............... *F21V 14/08* (2013.01); *F21K 9/56* (2013.01); *F21K 9/58* (2013.01); *F21S 10/007* (2013.01); *F21S 10/02* (2013.01); *F21V 29/74* (2015.01); *G02B 26/008* (2013.01); *H05B 33/0845* (2013.01); *H05B 33/0857* (2013.01);
(Continued)

(58) Field of Classification Search
CPC .......... F21V 14/08; F21V 29/74; F21K 9/56; F21K 9/58; F21S 10/007; F21S 10/02; G02B 26/008; H05B 33/0845; H05B 33/0857
See application file for complete search history.

(56) References Cited

U.S. PATENT DOCUMENTS 8,646,947 B2 * 2/2014 Li .................. H04N 9/3114
362/293
2003/0011538 A1 * 1/2003 Lys .................. A61N 5/0616
345/39

(Continued)

FOREIGN PATENT DOCUMENTS

| CN | 101460778 A | 6/2009 |
| WO | 2010133090 A1 | 11/2010 |
| WO | 2010140112 A1 | 12/2010 |
| WO | 2011060619 A1 | 5/2011 |

*Primary Examiner* — Mary Ellen Bowman

(57) ABSTRACT

Lighting device (1) comprising a plurality of LEDs (2a-2h) and a movable member (3) comprising a plurality of translucent segments (S1-S8) arranged such that the light from the LEDs (2a-2h) is transmitted therethrough. At least one of the translucent segments (S1-S8) comprises a wavelength conversion material. The lighting device (1) further comprises a control unit (5) for adjusting the color of the light emitted from the lighting device by controlling the power supplied to each one of the LEDs (2a-2h) in correspondence to the movable member (3), and by controlling the total power supplied to the lighting device (1) independently from the power supplied to each one of the plurality of LEDs (2a-2h).

15 Claims, 3 Drawing Sheets

(51) Int. Cl.
  F21S 10/02 (2006.01)
  G02B 26/00 (2006.01)
  F21V 29/74 (2015.01)
  F21K 99/00 (2016.01)
  H05B 33/08 (2006.01)
  *F21V 9/16* (2006.01)
  *F21Y 113/00* (2016.01)
  *F21Y 101/02* (2006.01)
(52) U.S. Cl.
  CPC ............. *F21V 9/16* (2013.01); *F21Y 2101/02* (2013.01); *F21Y 2113/005* (2013.01)

(56) References Cited

U.S. PATENT DOCUMENTS

| | | |
|---|---|---|
| 2007/0019408 A1 | 1/2007 | McGuire, Jr. et al. |
| 2009/0034284 A1 | 2/2009 | Li et al. |
| 2009/0187234 A1* | 7/2009 | Meyer .................... C09K 11/06 607/88 |
| 2009/0284148 A1 | 11/2009 | Iwanaga |
| 2011/0043764 A1 | 2/2011 | Narikawa |
| 2012/0068630 A1 | 3/2012 | Li et al. |
| 2012/0230013 A1 | 9/2012 | Xu |

* cited by examiner

COLOUR SEQUENTIAL LIGHTING DEVICE

CROSS-REFERENCE TO PRIOR APPLICATIONS

This application is the U.S. National Phase application under 35 U.S.C. §371 of International Application No. PCT/IB2013/052614, filed on Apr. 2, 2013, which claims the benefit of U.S. Provisional Patent Application No. 61/620,487, filed on Apr. 5, 2012. These applications are hereby incorporated by reference herein.

TECHNICAL FIELD

The present invention generally relates to lighting devices with enhanced color spectrum or adjustable color spectrum.

BACKGROUND

Light Emitting Diode (LED) lighting devices is a rapidly growing segment of lighting devices which have the advantage of offering high lumen output per energy unit due to their high efficacy. Furthermore, LED lighting devices are durable and robust which contributes to the environmental advantages of LED technology.

One of the drawbacks with conventional LED technology is that the LED as such generally emits light in a relatively narrow spectrum, thus altering the color of illuminated surfaces in comparison to the perceived color of a surface illuminated with sunlight, which is generally considered as a reference.

Various solutions have been suggested to make lighting devices based on LED technology better mimic sunlight, i.e. increasing the spectral content of the emitted light. These solutions include the use of different translucent wavelength conversion materials, through which the light generated in the LEDs is transmitted.

One embodiment proposed in US 2009/0187234 is a rotating wheel comprising a plurality of wavelength conversion materials rotated in front of a single LED at such speed that the eye integrates the individual light flashes that the wheel generates and such that no visible flicker is observed. The single LED is then perceived by the human eye as emitting light with a high frequency content comprising a mixture of the colors generated by the rotating wavelength conversion materials. US 2009/0187234 further suggests using Pulse Width Modulation (PWM) of the current to the LED for adjusting the color spectrum, and thus dimming certain frequencies.

SUMMARY

One drawback with pulsing an LED is that the total light output provided by the LED varies depending on the particular pulsing and hence there is a need for an improved lighting device which provides a more constant light output. A lighting device is therefore provided comprising a plurality of LEDs and a movable member comprising a plurality of translucent segments. At least one of the translucent segments comprises a wavelength conversion material. The movable member is positioned such that light from the LEDs is transmitted through the plurality of translucent segments. The member is movable relative to the LEDs such that the light transmitted through the plurality of translucent segments is perceived time sequentially as a mix (or mixture) of the light transmitted through each of the translucent segments.

The lighting device further comprises a control unit adapted to control the color of the light resulting from the mix (or mixture) by controlling the power supplied to the individual LEDs (i.e. of each one of the LEDs separately) in correspondence to the movement of the movable member such that the color of the light resulting from the lighting device is adjustable. The control unit might be further adapted to adjust the total power supplied to the lighting device independently from the power supplied to each one of the plurality of LEDs.

By adjusting the total power supplied to the lighting device it is possible to compensate for the variations in lumen output caused by the variation of the power supplied to one of the LEDs. The adjustment of the total power supplied to the lighting device further makes it possible to operate the lighting device at full power in any frequency spectrum and/or to dim the lighting device at any color. An advantage with keeping the total power supplied to the lighting device constant is that the light output provided by the lighting device could be at a maximum at any color for which the lighting device is adjusted.

The movable member is, according to one embodiment, a rotating disc in which the translucent segments are circular sectors rotating in front of the LEDs, such that the light from the LEDs is transmitted therethrough.

According to one embodiment, the lighting device comprises an electric actuator adapted to move the movable member such that the light transmitted through the plurality of translucent segments is perceived as a mix of the light transmitted through each of the translucent segments. The movable member may comprise a rotatable member, and the electric actuator may be an electric motor adapted to rotate the rotatable member for moving the translucent segments relative to the LEDs emitting the light. The rotatable member may for example comprise a disc arranged to rotate relative to the plurality of LEDs, and the LEDs may be positioned in a circular arrangement.

For obtaining a mix of the light which is perceived as a mix of the light transmitted through each of the translucent segments the movable member needs to be rapidly moved such that the lighting device flashes. To prevent visual flicker, the frequency of the light flashes needs to be sufficiently high, wherein the frequencies are dependent on the order of colored light flashes and the spectral compensation of these light flashes. In case the light flashes are a repetition cycle of Red, Green and Blue light flashes, the repetition frequency of such a cycle (Red, Green, Blue) should be 50 Hz or more, and preferably even 150 Hz or more. The perception of flicker is also dependent on the pulse width of the individual flashes. E.g. 50 Hz cycles of RGB pulses of 1 msec each are more visible, i.e. have a higher perception of flicker, than 50 Hz cycles of RGB pulses of 2 msec each, and a cycle of RGB pulses is more visible, i.e. have a higher perception of flicker, than a cycle of YRGB (Yellow) pulses, since each Yellow pulse is a composition of Green and Red.

According to one embodiment, the wavelength conversion material is a phosphor converting the wavelength of the light transmitted therethrough.

The movable member may further comprise at least one transparent segment, arranged such that the light transmitted through the transparent segment remains unchanged. The inclusion of a transparent segment makes it possible to have the light frequency emitted from the LEDs as a component in the resulting light. The transparent segments have the advantage of not adding any loss in its corresponding part of the light composition.

According to one embodiment, the power supplied to the LEDs is controlled by pulsing the power supplied to the LEDs, for example by means of a pulse width modulation unit in the control unit. The pulse width modulation unit may for example be implemented by means of a semiconductor switch. The control unit may be adapted to control the power supplied to the LEDs such that the power consumption of the device is constant regardless of the color of the emitted light. In this way the same total effect of the lighting device is maintained, for example the light intensity can thus be maintained at a maximum level regardless of the color emitted from the lighting device.

According to one embodiment, the control unit is adapted to control the total power supplied to the lighting device such that the total power consumed by the lighting device varies less than a predefined percentage or value (of its current value), such as less than 5%, upon variation of the color of the light emitted by the lighting device. Alternatively, in other embodiments, the control unit may be configured to control the total power supplied to the lighting device such that the total illumination provided by the lighting device varies less than a predetermined threshold, such as less than 10%, or less than 5%, upon variation of the color of the light emitted by the lighting device.

According to one embodiment of the lighting device, the movable member further comprises cooling means adapted to increase an airflow passing the LEDs and/or the translucent segments. The cooling means may comprise blades mounted to the movable member. The blades may be mounted to the movable member such that they do not obstruct the light from the LEDs.

In one embodiment the movable member comprises a disc adapted to rotate relative to the plurality of LEDs, and the cooling means comprises blades mounted to the disc. The blades may be mounted to the disc in a circular arrangement having a smaller diameter than the diameter of a circular arrangement in which the LEDs are positioned and/or a larger diameter than the diameter of the circular arrangement in which the LEDs are positioned. Mounting the blades at a different diameter than the LEDs enables the blades to provide cooling without obstructing the light from the LEDs.

A method for controlling a lighting device is further provided. The lighting device comprises a plurality of LEDs and a movable member comprising a plurality of translucent segments arranged such that the light from the LEDs is transmitted therethrough. At least one of the translucent segments comprises a wavelength conversion material, e.g. a phosphor material. The method comprises controlling the color of the light emitted from the lighting device by controlling the power supplied to each one of the LEDs, e.g. by pulsing the power, and the movement of the movable member, and controlling the total power supplied to the lighting device independently from the power supplied to each one of the plurality of LEDs.

According to one embodiment, controlling the color of the light emitted from the lighting device comprises pulsing the power supplied to at least one of the LEDs, and controlling the total power supplied to the lighting device comprises compensating for the reduction in total power caused by the pulsing of the power supplied to the at least one LED by increasing the total power supplied to the lighting device and thus maintaining the same overall power consumption of the lighting device, or vice versa in case the control of the color of the light emitted from the lighting device via pulsing of the power induces an increase in total power.

It should be noted that the invention relates to all possible combinations of features recited in the claims. Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

Aspects of the present invention will now be described in more detail, with reference to the appended drawings showing embodiments of the invention.

FIG. 5a is another schematic side view of an embodiment of the lighting device comprising cooling means; and FIG. 5b is an elevated view of the rotatable member of the lighting device shown in FIG. 5a.

All the figures are schematic, not necessarily to scale, and generally only show parts which are necessary in order to elucidate the invention, wherein other parts may be omitted or merely suggested.

DETAILED DESCRIPTION

A lighting device is provided which comprises a plurality of LEDs (such as e.g. at least two LEDs) arranged in a configuration such that a movable member comprising a plurality of translucent segments can be positioned and moved relative to the LEDs such that light emitted from the LEDs is transmitted through the plurality of translucent segments. Some of the translucent segments are equipped with wavelength conversion material such that the wavelength of the light transmitted therethrough is converted. The movable member moves at such speeds that the light at different wavelengths is perceived by the human eye as a single color without any noticeable flicker. A control unit connected to the lighting device is adapted to control the power supplied to the individual LEDs, e.g. by means of pulse width modulation, such that certain LEDs can be dimmed. The sequential timing between the movement of the movable member comprising the segments, and the pulsing of the power supplied to the individual LEDs, makes it possible to change the color of the resulting light emitted by the complete lighting device. The pulsing of the light from one or more of the LEDs in the lighting device at the moment its light traverses through a particular segment results in a reduction of certain parts in the light spectrum as emitted by the lighting device, for the colors corresponding to that particular segment. This pulsing also reduces the power consumption of the device. To compensate for this power reduction the control unit is further adapted to control the total power supplied to the lighting device such that the reduced power consumption is compensated, e.g. the pulsing of one of the LEDs in the lighting device for the purpose of changing of the color of the emitted light can be compensated by increasing the power supplied to the LED when it illuminates other segments.

In the following, a detailed description of embodiments of the invention will be given with reference to the accompanying drawings. It will be appreciated that the drawings are for illustration only and are not in any way restricting the scope. Any references to direction, such as "up" or "down", are only referring to the directions shown in the figures.

Figure 1:
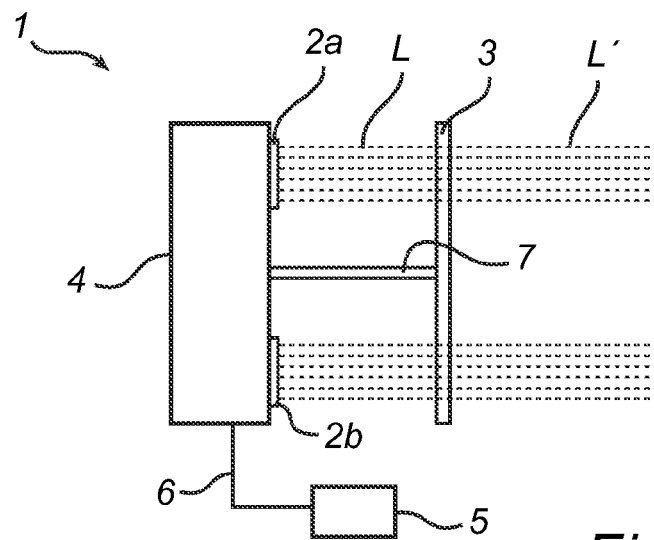
FIG. 1 is a schematic side view of a lighting device according to one embodiment.

FIG. 1 shows a lighting device 1 according to one embodiment. The lighting device 1 comprises a plurality of LEDs 2a, 2b positioned on a carrier plate 4. The LEDs 2a, 2b emit light L having a first wavelength, which for example may be a blue wavelength (440-490 nm). The lighting device 1 further comprises a movable member 3, comprising a plurality of translucent segments S1-S8 through which the light L from the LEDs 2a, 2b is transmitted. At least one of the translucent segments S1-S8 comprises a wavelength conversion material adapted to convert the wavelength of the light L from the plurality of LEDs 2a, 2b into a light L' having a second wavelength. Such a conversion may be obtained by a phosphor material adapted to absorb light having the first wavelength of the light emitted by the LEDs 2a, 2b and adapted to emit light of the second wavelength. Other alternatives may be envisaged, e.g. based on the use of color filters. The movable member 3 is positioned such that light L from the LEDs 2a, 2b is transmitted through the plurality of translucent segments S1-S8 and the movable member 3 is adapted to be moved such that the light L transmitted through the plurality of translucent segments S1-S8 is perceived as a time sequential mix of the light transmitted through each of the translucent segments S1-S8. The lighting device 1 according to the embodiment shown in FIG. 1 further comprises a control unit 5 connected by means of a lead 6 to the LEDs 2a, 2b mounted to the carrier plate 4. The control unit 5 is adapted to control the power supplied to the individual LEDs 2a, 2b, such that the color of the resulting total light emitted from the lighting device 1 can be changed by the coordination between the movable member 3 and the power control of the LEDs 2a, 2b. The movable member 3 is for example adapted to be moved by an actuator, such as an electric motor, adapted to create a rotating or linear movement of the movable member 3.

The control unit 5 is further adapted to adjust the total power supplied to the lighting device 1 independently from the power supplied to each one of the plurality of LEDs, thus enabling the adjustment of the total power supplied to the lighting device 1 and making it possible to operate the lighting device 1 at full power in any frequency spectrum and/or to dim the lighting device 1 at any color. As the eye integrates the time sequential light flashes into a single color without noticeable flicker (due to the high frequency of the flashes), every LED will realize the same spectral content. As every LED realizes light having similar (spectral and angular) light properties, the lighting device will have good beam properties and color consistency within the beam. As the light is generated from all of the LEDs, it will be generated at a small surface, i.e. each spot in the surface will emit the same spectral composition of the light, and the surface will emit the same spectral light-distribution towards all angles where the light is captured in the beam.

Figure 2:
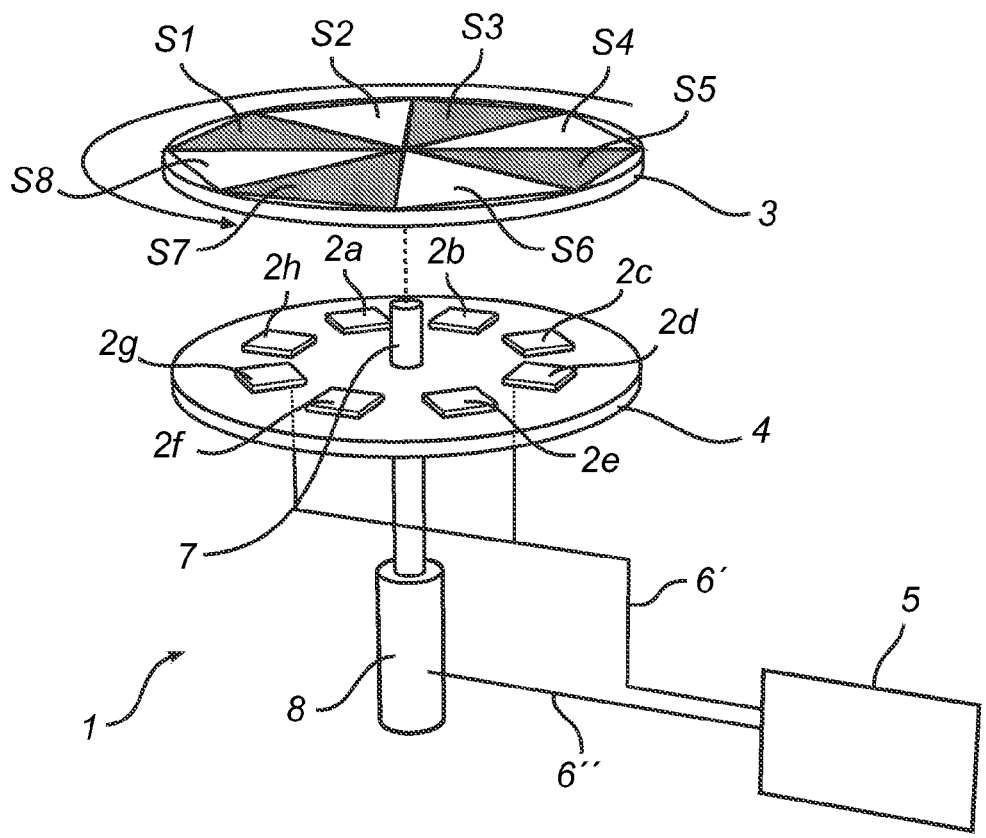
FIG. 2 is a schematic side view of the lighting device, together with a schematic top view of the rotating member and the carrier plate according to one embodiment.

FIG. 2 shows an embodiment of the lighting device 1 in which the movable member 3 is a rotatable disc 3 comprising a plurality of translucent segments S1-S8. The rotatable disc 3 is rotatable relative to a carrier plate 4 comprising a plurality of LEDs 2a-2h positioned in a circular configuration. The rotatable disc is rotatable by means of a motor 8 connected to the disc by means of a shaft 7 running freely through the carrier plate 4. The LEDs positioned on the carrier plate are arranged to illuminate the segments S1-S8 in a time sequential manner at such a speed that the eye integrates each series of light flashes originating from each LED to a single color without noticeable flicker. At least some of the segments S1-S8 in the rotatable disc 3 comprise a wavelength conversion material such that the wavelength and thus the color of the light is converted when transmitted through the corresponding material. The wavelength conversion materials may for example comprise different phosphor regions. Phosphors are materials that exhibit photoluminescence such that they fluoresce at different wavelengths. Phosphors are generally made of one or more layers of phosphor coated on different spatial regions of a transparent material such as glass or plastic. The layers coated on different spatial regions of the transparent material may comprise different phosphors or different mixtures of phosphors or other materials. In some embodiments, one or more of the spatial regions may include layers formed from materials other than phosphor. For example, one or more of the regions may comprise dichroic filters, absorption filters, interference filters or transparent regions with no color modifying properties. The segments that do not contain wavelength conversion material either do not contain any material at all, or comprises a transparent material not changing the wavelength of the light transmitted through the material, e.g. a sheet of glass or transparent plastic. The transparent or empty segments emit the fundamental wavelengths of the LED (typically blue colors).

The conversion of blue light by a phosphor layer covering a particular LED might lead to "colour over angle" issues. A LED die usually emits blue light to all directions and, as such, the optical distance of a particular (blue) light ray as it originates from the LED die at different angles will traverse the phosphor layer with different optical path length. As a result, the light intensity of the blue light rays passing through the phosphor layer at non perpendicular angles is lower than for the light rays passing perpendicularly, causing for a different color of the light over different angles of incidence. The phosphor filters in the member 3 can be designed in such a way that all blue light incident on a particular phosphor elements is converted by that phosphor element, and as such a negligible amount of blue light from the LED will pass through that particular filter element. The blue part in the light spectrum of one embodiment may then only originate from the blue light of the LED passing the transparent element(s) in the member 3, and as such does not create any color over angle differences in the light beam.

The lighting device according to the embodiment shown in FIG. 2 further comprises a control unit 5 adapted to control the motor and thus the rotation of the disc by means of a lead 6" connecting the control unit 5 and the motor 8. The control unit is further connected to each of the LEDs by means of a different lead 6', for pulsing the power supplied to the LEDs in a time sequential manner in relation to the rotation of the rotating disc 3. By pulsing the power supplied to the LEDs, a smaller pulse can be provided to a particular LED when a specific segment is passing the LED, causing less output of that frequency from the lighting device 1, and thus altering the perceived color of the resulting light beam as emitted from the light source. By increasing the pulse length of pulses that pass through a transparent or empty segment the color is changed. If a certain wavelength should be pulsed for a time being significantly longer than that of other wavelengths it may be necessary to alter the size of one or more of the segments for enabling the speed of the disc to remain constant. This size of one or more segments then differs in the direction of the movement of the member or disc.

The control unit 5 is, in accordance with the embodiment disclosed with reference to FIG. 1, further adapted to control the total power supplied to the lighting device 1 such that the total light emitted from the lighting device can be controlled independently from the control of the resulting color of the light emitted from the lighting device i.e. independently from the power supplied to each one of the plurality of LEDs. The separate control of the total power supplied to the lighting device enables the lighting device 1 to be operated at full power regardless of color and/or be dimmed regardless of color.

The lighting device according to any of the embodiments disclosed herein may comprise a light plug such that the lighting device can be inserted into conventional light bulb sockets.

Figure 3:
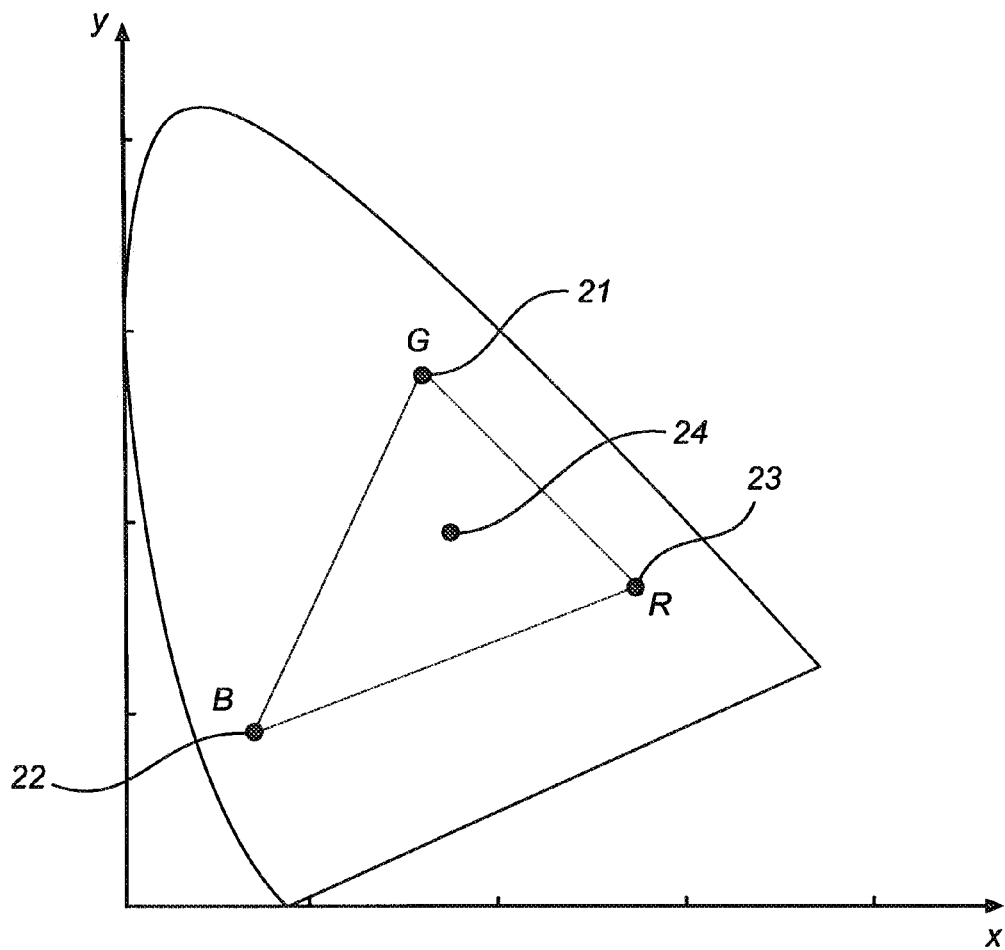
FIG. 3 is a CIE 1931 color diagram describing how the color of the light emitted from the lighting device can be changed.

FIG. 3 shows a CIE 1931 color diagram in an embodiment where a movable member comprises wavelength conversion material such as e.g. Lime phosphors with the primary color coordinates at point 21, Red phosphors with the primary color coordinates at point 23 and transparent segments with the primary color coordinates representing the blue color emitted from the LEDs at point 22. When the movable member moves, the eye will see the color obtained by mixing the Lime phosphors, the Red phosphor and the light form the Blue LEDs that is transmitted through the transparent segment. The resulting light is in a white region represented by point 24 in the CIE 1931 color diagram. As the power supplied to the LEDs is pulsed, the color can be adjusted within a triangle in the color spectrum having the corners at the primary color coordinates 20, 21, 23.

By using the control unit (such as the control unit 5 described in FIGS. 1 and 2) for controlling the total power supplied to the lighting device, the total power supplied to the lighting device can be kept constant while the color emitted by the lighting device is modified.

As an example a lighting device is provided according to the embodiment described with reference to FIG. 2 comprising 8 pieces of 1 Watt LEDs and the amount of blue light emitted from the lighting device should be reduced. Each time when a transparent segment is in front of a particular LED, the power supplied to that LED may be pulsed, e.g. with 50% duty cycle during the ⅛ of the cycle time (the time that the rotating disc (3 in FIG. 2) makes one full circle (360 degrees) to obtain a desired white colour. The power supplied to each LED will then be reduced towards (⅛*0.5+⅞*1)=0,937 W and the lighting device output is moved in a direction away from the color point 22 in the CIE 1931 color diagram of FIG. 3. At this moment the LEDs will not be driven to their maximum nominal power of 1 Watt each, but instead to only 0.937 Watt each. This is then compensated by boosting the power supplied to all LEDs with a factor of 1/0,937=1.067. The average power for each LED then becomes (⅛*0.5+⅞*1)*1.067=1.000 Watt, and the total power supplied to the lighting device is once again 8 Watt.

Figure 4:
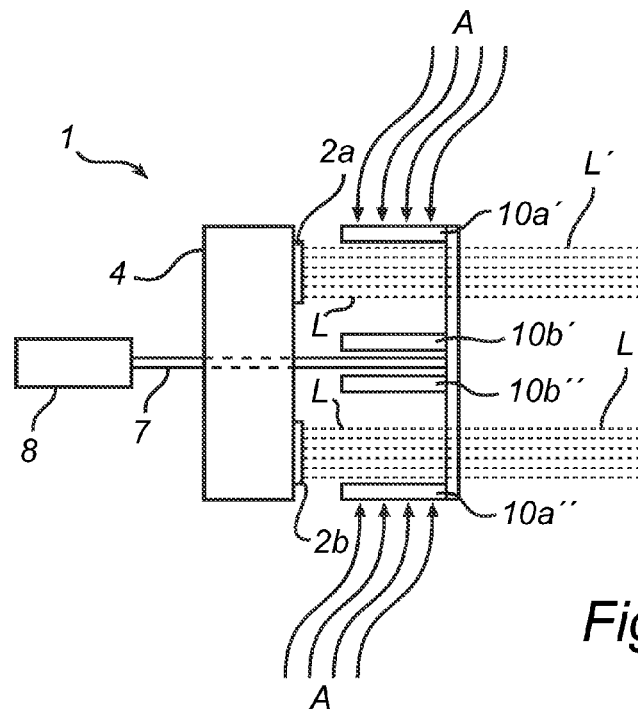
FIG. 4 is a schematic side view of an embodiment of the lighting device comprising cooling means.

FIG. 4 shows an embodiment of the lighting device including the components of the lighting device disclosed with reference to FIG. 1. The lighting device according to the embodiment of FIG. 4 further comprises cooling means 10a'-10b" adapted to increase an airflow A passing the LEDs 2a, 2b or the translucent segments S1-S6. According to the embodiment shown in FIG. 4 the cooling means comprises blades 10a'-10b" mounted to the movable member 3 such that the movement of the blades 10a'-10b" increases the airflow A. In the embodiment shown in FIG. 4, the movable member is a rotatable disc 3 connected to an electric motor by means of a shaft. The cooling means comprises two sets of blades 10a'-10a", 10b'-10b", which are mounted to the disc 3 in a circular arrangement. The first set of blades are mounted in a circular arrangement having a larger diameter than the diameter of the circular arrangement in which the LEDs 2a, 2b are positioned, whereas the second set of blades 10b', 10b" are mounted in a circular arrangement having a smaller diameter than the diameter of the circular arrangement in which the LEDs 2a, 2b are positioned. By means of this mounting, the blades do not obstruct the light L from the LEDs when providing cooling.

Figures 5A, 5B:
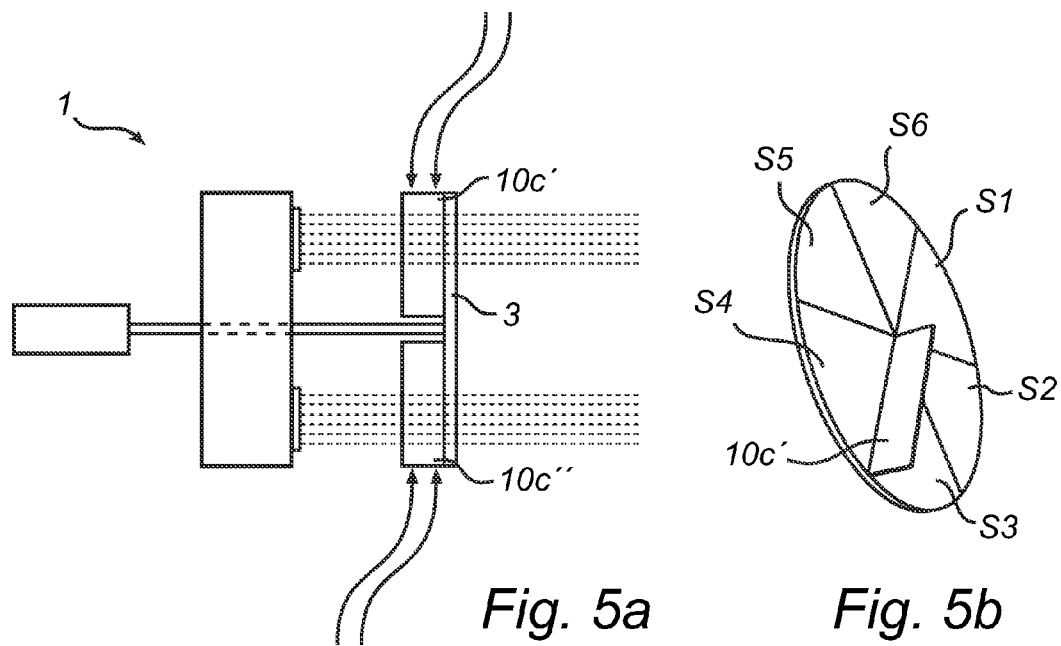

FIG. 5a, 5b shows an embodiment of the lighting device 1 similar to that of FIG. 4. The difference being that the blades 10c', 10c" are mounted in a circular arrangement perpendicularly to the surface of the disc 3 and overlapping the diameter of the circular arrangement in which the LEDs are positioned. As the light from the LEDs is pulsed, the lighting device 1 can be synchronized such that the blades do not obstruct the light, thus making it possible to have blades mounted at the same diameter as the LEDs without obstructing the resulting light.

A detailed description of embodiments comprising the fundamental novel features of the invention as applied to that embodiment, it should be understood that various omissions and substitutions and changes in the form and details of the devices and methods described may be made by those skilled in the art without departing from the spirit of the invention. The embodiments are to be seen as part of the general description and therefore possible to combine in any way in general terms. It should also be recognized that any reference signs shall not be considered limiting to the scope of the claims.

The invention claimed is:

1. A lighting device comprising:
   a plurality of LEDs,
   a movable member comprising a plurality of translucent segments, wherein at least one of the translucent segments comprises a wavelength conversion material, the movable member being positioned such that light from the LEDs is transmitted through the plurality of translucent segments, wherein the member is movable relative to the LEDs such that the light transmitted through the plurality of translucent segments is perceived as a mix of the light transmitted through each of the translucent segments, and
   a control unit adapted to control the color of the light resulting from the mix by controlling the power supplied to the individual LEDs in correspondence to the movement of the movable member such that the color of the light resulting from the lighting device is adjustable,
   wherein the control unit is adapted to adjust the total power supplied to the lighting device independently from the power supplied to each one of the plurality of LEDs.

2. The lighting device according to claim 1, further comprising an electrical actuator adapted to actuate the movable member.

3. The lighting device according to claim 1, wherein the movable member comprises a rotatable member, the lighting device further comprising an electrical actuator with an electrical motor adapted to rotate the rotatable member.

4. The lighting device according to claim 1, wherein the movable member comprises a disc arranged to rotate relative to the plurality of LEDs.

5. The lighting device according claim 1, wherein the LEDs are positioned in a circular arrangement.

6. The lighting device according to claim 1, wherein the wavelength conversion material is a phosphor.

7. The lighting device according to claim 1, wherein at least one of the translucent segments is a transparent segment arranged such that the wavelength of the light transmitted through the transparent segment remains unchanged.

8. The lighting device according to claim 1, wherein the control unit is adapted to control the power supplied to the LEDs by pulsing the power supplied to the LEDs.

9. The lighting device according to claim 1, wherein the control unit is adapted to control the total power supplied to the lighting device such that the total power consumed by the lighting device varies less than a predefined value, such as less than 5%, upon variation of the color of the light emitted by the lighting device.

10. The lighting device according claim 1, wherein the control unit is adapted to pulse the power supplied to at least one of the LEDs for changing the color emitted by the lighting device, and wherein the control unit is adapted to compensate for the reduction in total power caused by the pulsing of the power supplied to the at least one LED by increasing the total power supplied to the lighting device and thus maintaining the same total effect of the lighting device.

11. The lighting device according to claim 1, wherein the movable member comprises cooling means adapted to increase an airflow passing the LEDs.

12. The lighting device according to claim 1, wherein the movable member comprises cooling means adapted to increase an airflow passing the translucent segments.

13. The lighting device according to claim 1, wherein the cooling means comprises blades mounted to the movable member.

14. A method for controlling a lighting device, the lighting device comprising a plurality of LEDs and a movable member comprising a plurality of translucent segments arranged such that the light from the LEDs is transmitted therethrough, wherein at least one of the translucent segments comprises a wavelength conversion material, the method comprising:
    controlling the color of the light emitted from the lighting device by controlling the power supplied to each one of the LEDs in correspondence to the movable member, and controlling the total power supplied to the lighting device independently from the power supplied to each one of the plurality of LEDs.

15. The method according to claim 14, wherein controlling the color of the light emitted from the lighting device comprises pulsing the power supplied to at least one of the LEDs, and wherein controlling the total power supplied to the lighting device comprises compensating for the reduction in total power caused by the pulsing of the power supplied to the at least one LED by increasing the total power supplied to the lighting device and thus maintaining the power consumption of the lighting device.

* * * * *